(12) United States Patent
Fiatal

(10) Patent No.: US 11,552,918 B2
(45) Date of Patent: *Jan. 10, 2023

(54) SYSTEM AND METHOD OF A RELAY SERVER FOR MANAGING COMMUNICATIONS AND NOTIFICATION BETWEEN A MOBILE DEVICE AND APPLICATION SERVER

(71) Applicant: Seven Networks, LLC, Marshall, TX (US)

(72) Inventor: Trevor Fiatal, Fremont, CA (US)

(73) Assignee: Seven Networks, LLC, Marshall, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/387,366

(22) Filed: Jul. 28, 2021

(65) Prior Publication Data

US 2021/0359967 A1 Nov. 18, 2021

Related U.S. Application Data

(63) Continuation of application No. 16/876,661, filed on May 18, 2020, now Pat. No. 11,102,158, which is a continuation of application No. 15/231,713, filed on Aug. 8, 2016, now Pat. No. 10,659,417, which is a continuation of application No. 14/468,282, filed on
(Continued)

(51) Int. Cl.
*H04L 51/224* (2022.01)
*H04L 67/75* (2022.01)
*H04L 9/40* (2022.01)
*H04W 12/06* (2021.01)
*H04L 45/02* (2022.01)
*H04L 67/02* (2022.01)
*H04L 51/58* (2022.01)

(52) U.S. Cl.
CPC .......... *H04L 51/224* (2022.05); *H04L 45/026* (2013.01); *H04L 63/10* (2013.01); *H04L 67/02* (2013.01); *H04L 67/75* (2022.05); *H04W 12/06* (2013.01); *H04L 51/58* (2022.05); *H04L 63/08* (2013.01)

(58) Field of Classification Search
CPC ....... H04L 45/026; H04L 51/24; H04L 63/10; H04L 67/02; H04L 67/36; H04L 67/04; H04W 12/06
See application file for complete search history.

(56) References Cited

U.S. PATENT DOCUMENTS 8,799,410 B2 * 8/2014 Fiatal ...................... H04L 63/10
709/219
8,838,744 B2 * 9/2014 Fiatal ..................... H04W 12/06
709/219
(Continued)

*Primary Examiner* — Jeong S Park
(74) *Attorney, Agent, or Firm* — NK Patent Law

(57) ABSTRACT

Providing a mobile device with web-based access to data objects is disclosed. Authentication information is sent from a mobile device to a relay server. The relay server executes a connection application to establish a connection to a web access server. The authentication information is provided to the web access server associated with a data store hosting a data object. Upon authentication, the data object is provided to the relay server from the data store. The data object is then provided to the mobile device.

20 Claims, 3 Drawing Sheets

Related U.S. Application Data

Aug. 25, 2014, now abandoned, which is a continuation of application No. 12/361,434, filed on Jan. 28, 2009, now Pat. No. 8,838,744.

(60) Provisional application No. 61/062,797, filed on Jan. 28, 2008.

(56) References Cited

U.S. PATENT DOCUMENTS

| | | | |
|---|---|---|---|
| 10,659,417 B2* | 5/2020 | Fiatal | H04L 67/75 |
| 11,102,158 B2* | 8/2021 | Fiatal | H04L 63/10 |
| 2002/0174194 A1 | 11/2002 | Mooney et al. | |
| 2003/0157947 A1 | 8/2003 | Fiatal et al. | |
| 2004/0039905 A1 | 2/2004 | Leoutsarakos | |
| 2004/0233930 A1* | 11/2004 | Colby, Jr. | H04W 12/069 |
| | | | 370/464 |
| 2005/0038863 A1 | 2/2005 | Onyon et al. | |
| 2005/0071674 A1* | 3/2005 | Chou | H04L 63/02 |
| | | | 726/4 |
| 2005/0257057 A1 | 11/2005 | Ivanov et al. | |
| 2006/0077940 A1 | 4/2006 | Ganji | |
| 2006/0155811 A1* | 7/2006 | Goh | G06Q 10/107 |
| | | | 709/206 |
| 2006/0190569 A1 | 8/2006 | Neil et al. | |
| 2007/0019610 A1* | 1/2007 | Backholm | H04W 76/25 |
| | | | 370/349 |
| 2008/0171556 A1* | 7/2008 | Carter | H04W 24/08 |
| | | | 707/999.201 |
| 2008/0244415 A1* | 10/2008 | Shim | H04L 51/58 |
| | | | 715/740 |

* cited by examiner

SYSTEM AND METHOD OF A RELAY SERVER FOR MANAGING COMMUNICATIONS AND NOTIFICATION BETWEEN A MOBILE DEVICE AND APPLICATION SERVER

CROSS-REFERENCE TO RELATED APPLICATION(S)

The present application is a continuation of U.S. patent application Ser. No. 16/876,661 filed May 18, 2020, which is entitled "SYSTEM AND METHOD OF A RELAY SERVER FOR MANAGING COMMUNICATIONS AND NOTIFICATION BETWEEN A MOBILE DEVICE AND APPLICATION SERVER", which is a continuation of U.S. patent application Ser. No. 15/231,713 filed Aug. 8, 2016, which is entitled "SYSTEM AND METHOD OF A RELAY SERVER FOR MANAGING COMMUNICATIONS AND NOTIFICATION BETWEEN A MOBILE DEVICE AND APPLICATION SERVER", now U.S. Pat. No. 10,659,417 issued May 19, 2020, which is a continuation of U.S. patent application Ser. No. 14/468,282 filed Aug. 25, 2014, which is entitled "SYSTEM AND METHOD OF A RELAY SERVER FOR MANAGING COMMUNICATIONS AND NOTIFICATION BETWEEN A MOBILE DEVICE AND APPLICATION SERVER", which is a continuation of U.S. patent application Ser. No. 12/361,434 filed Jan. 28, 2009, which is entitled "WEB-BASED ACCESS TO DATA OBJECTS", now U.S. Pat. No. 8,838,744 issued Sep. 16, 2014, which claims the priority benefit of U.S. Provisional Patent Application No. 61/062,797 filed Jan. 28, 2008, which is entitled "SYSTEMS AND METHODS FOR DATA TRANSPORT", the disclosures of which are incorporated herein by reference.

TECHNICAL FIELD

The present invention generally relates to wireless mobile device services. More specifically, the present invention relates to providing wireless mobile device services with web-based access to data objects.

BACKGROUND

In a network, the hosts most vulnerable to attack are those that provide services to users outside of the local area network (LAN). Due to the increased potential for being compromised, these hosts may be placed into their own sub-network in order to protect the rest of the network should an intruder successfully attack and infiltrate the service providing host. The sub-network is often referred to as a demilitarized zone (DMZ). In some instances, the DMZ may also be referred to as a demarcation zone or a perimeter network.

A DMZ is a physical or logical sub-network that contains an organization's external services as proffered over a larger, un-trusted network such as the Internet. The purpose of a DMZ is to add an additional layer of security to an organizational LAN. Hosts in the DMZ are generally not able to establish communication directly with any other host in the internal network although communication with other hosts in the DMZ and to the external network is allowed. This network configuration allows hosts in the DMZ to provide services to both the internal and external network while protecting the internal network from attack and infiltration.

Services provided to users in an external network are usually hosted in the DMZ. Common services may be provided by web servers. Other servers, such as database servers or e-mail servers, are not included in the DMZ because they may contain sensitive or confidential information. For example, e-mail may be stored on an internal e-mail server. A mail server in the DMZ passes incoming e-mail to the internal e-mail server; the internal e-mail server then passes outgoing e-mail to the mail server in the DMZ.

Common e-mail applications that may utilize a configuration with a mail server in the DMZ include Microsoft Exchange and Lotus Domino. These enterprise e-mail applications allow a user to view and manage their e-mail using a computing device with the respective e-mail client software installed (e.g., Microsoft Outlook or Lotus Notes). Using an intermediate mail server that is independent from the protected mail server allows for access to e-mail without having to be 'on' the protected network (e.g., during non-work hours when a user is away from a work computer).

FIG. 1 illustrates network architecture 100 as known in the prior art. Communication in network 100 may utilize a variety of communication networks including the Global System for Mobile communications (GSM), the General Packet Radio Service (GPRS), Enhanced Data rates for GSM Evolution (EDGE), Code Division Multiple Access (CDMA), or networks using the 3G mobile network standard. Network 100 may further include landline or satellite networks.

Network 100 may further include various computing devices hosting and executing any variety of connection applications (e.g., connection management application 120). These applications may be distributed across multiple devices, hosted on a single device, or integrated with various other applications at a data store (e.g., data store 110). Connector applications may be built for specific applications, data, data stores, and services.

In the network 100 illustrated in FIG. 1, e-mail arrives and resides at data store 110 (e.g., a Microsoft Exchange Server). This data store 110 may be located behind a firewall 130 in certain networks (e.g., a corporate LAN) as illustrated in FIG. 1. In some instances, however, a firewall may not be present.

Connection management application 120 is software installed at the data store 110. Execution of the application 120 by a processing device at this data store 110 provides for notifications to be delivered to e-mail account holders at, for example, a mobile device 150. These notifications may indicate the arrival of new e-mail at the data store 110. In some prior art systems, the connector application 120 may be installed on an enterprise server (e.g., an Exchange Server) or a personal computing device operating in conjunction with data store 110 (e.g., a desktop computer communicatively coupled to an Exchange Server).

Some e-mail account holders may wish to access e-mail at data store 110 through mobile device 150. Mobile device 150 is inclusive of any variety of mobile devices that are capable of communicating over the Internet. Such communication may also include the use of a wireless or landline network. Mobile device 150 is inclusive of cellular telephones, smart phones, personal digital assistants (PDAs), wireless e-mail devices, and handheld computing devices. A variety of mobile networks and communications channels for allowing Internet access are well known in the art.

Notifications, in FIG. 1, may be delivered to mobile device 150 via an intermediate relay server 140 (e.g., a store-and-forward device such as a Blackberry Server) located outside the firewall 130. This relay server 140 may be hosted by a network service provider. Mobile device 150 receives notification that new e-mail has arrived at the data store 110. In some prior art systems, a copy of the message may be delivered to the mobile device 150 instead of a notification. Relay server 140 includes one or more network interfaces to allow for communications over a network including the receipt and transmission of authentication information as well as the receipt and transmission of information from data store 110.

E-mail delivery in the prior art network 100 of FIG. 1 may be initiated in various ways. For example, e-mail may be pushed to the mobile device 150. For enterprises in which there are multiple users, many of whom will have different mobile devices, mobile operating systems, and e-mail applications, multiple server installations or connection management applications may be required. Such a solution may be complex, time-consuming, and costly with respect to not only equipment but also with respect to costs related to training and management for IT professionals tasks with keeping a network up and running.

Alternatively, a user may access e-mail through the Internet. Optional web access server 160, which may be located on the network DMZ, provides a user with remote access to e-mail stored at data store 110 and behind the firewall 130. One common example of such remote, web-based access is Outlook Web Access (OWA). OWA is a web-mail service found in Microsoft Exchange Server 5.0 and later. OWA provides users with access to e-mail received in the Microsoft Outlook e-mail application via a web browser.

Web access server 160, such as one used to provide OWA, allows for access to e-mail (including support for S/MIME), as well as calendars, contacts, tasks, and other content when the respective desktop application is unavailable. For example, a user may be using a public computing device (e.g., a public computer at an Internet cafe (170)) without the required mail client applications installed (e.g., Microsoft Outlook). If the computing device 170 has Internet access, however, users at device 170 may interface with data store 110 and review electronic mail or other data through a web-page associated with the web access server 160.

Contrary to a pure "push" based e-mail or notification system, web-based access generally requires that the user log in and initiate a web-based session each time the user wishes to view e-mail. To log in, the user provides certain credentials to authenticate user identity (e.g., a user name and password). For security purposes, after a period of inactivity, the session may time out thereby requiring the user to once again provide credentials for the purpose of re-authentication. Such operations may be especially time-consuming for mobile devices, since user interfaces on mobile device are generally much more limited than those on desktop computing devices.

SUMMARY

In a first claimed embodiment, a mobile device sends authentication information to a relay server, which executes a connection application to establish a connection to a web access server. Using the established connect, the relay server transmits the authentication information to the web access server associated with a data store hosting a data object. The web access server authenticates the user providing such authentication information. The data object is provided from the data store to the relay server, which provides the data store to the mobile device.

A second claimed embodiment is for a computing device for providing a mobile device with web-based access to data objects. The computing device includes a memory for storing a connection application executable to establish connections with a web access server and a processor for executing the connection application to establish a connection to the web access server associated with a data store hosting the data object. A network interface receives authentication information for the data store, transmits the received authentication information to the web access server via the established connection for subsequent authentication of a user seeking access to the data store. The network interface receives the data object following authentication of the user to the data store by the web access server and transmits the data object to the mobile device.

A third claimed embodiment is for a computer-readable storage media upon which is embodied a program executable to provide a mobile device web-based access to data objects.

DETAILED DESCRIPTION

Embodiments of the present invention provide a mobile device with access to data objects via the World Wide Web (i.e., web-based access). Authentication information is sent from a mobile device to a relay server. The relay server executes a connection application to establish a connection to a web access server. The authentication information is provided to the web access server associated with a data store hosting a data object. Upon authentication, the data object is provided to the relay server from the data store. The data object is then provided to the mobile device.

Figure 1:
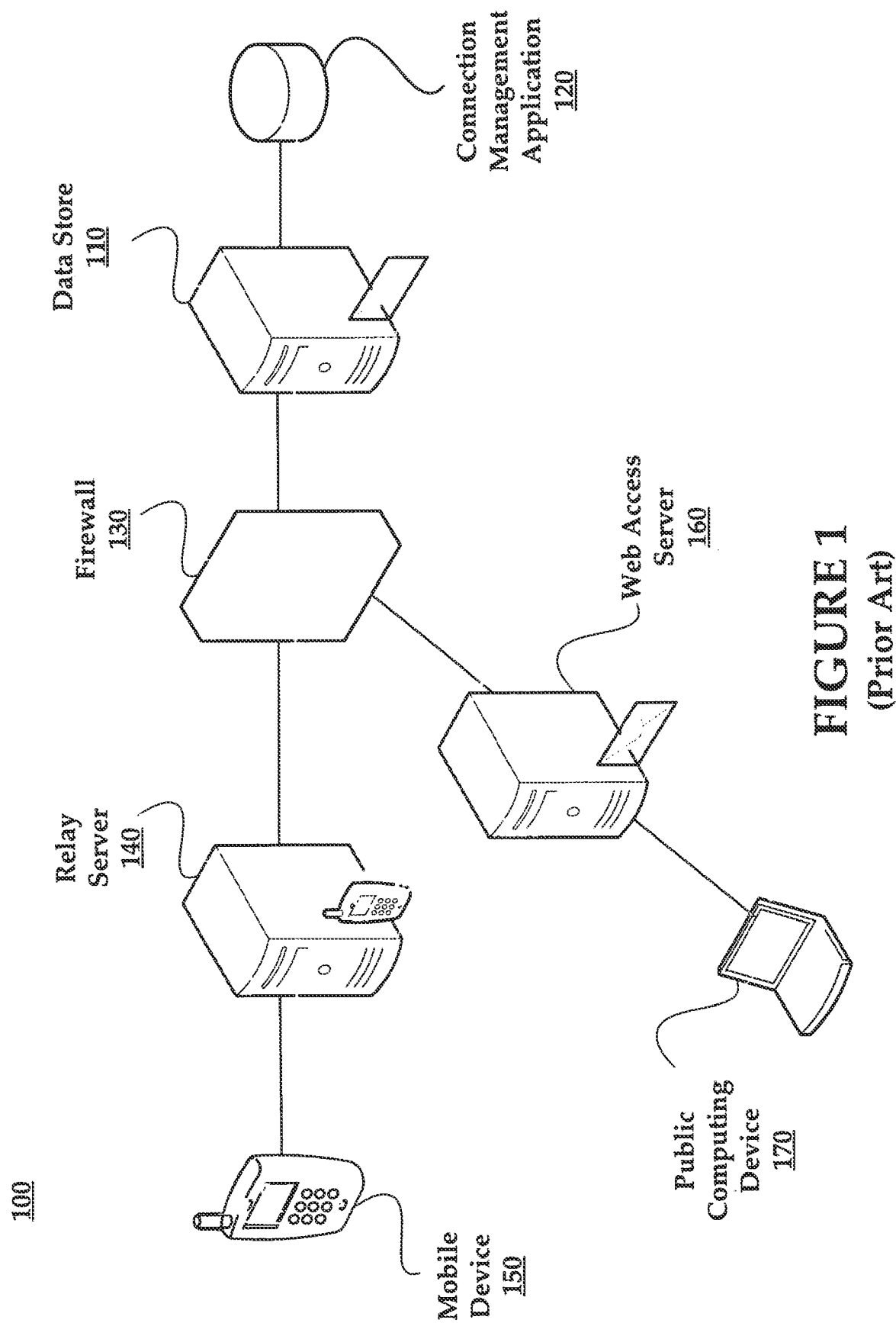
FIG. 1 illustrates network architecture as known in the prior art.
Figure 2:
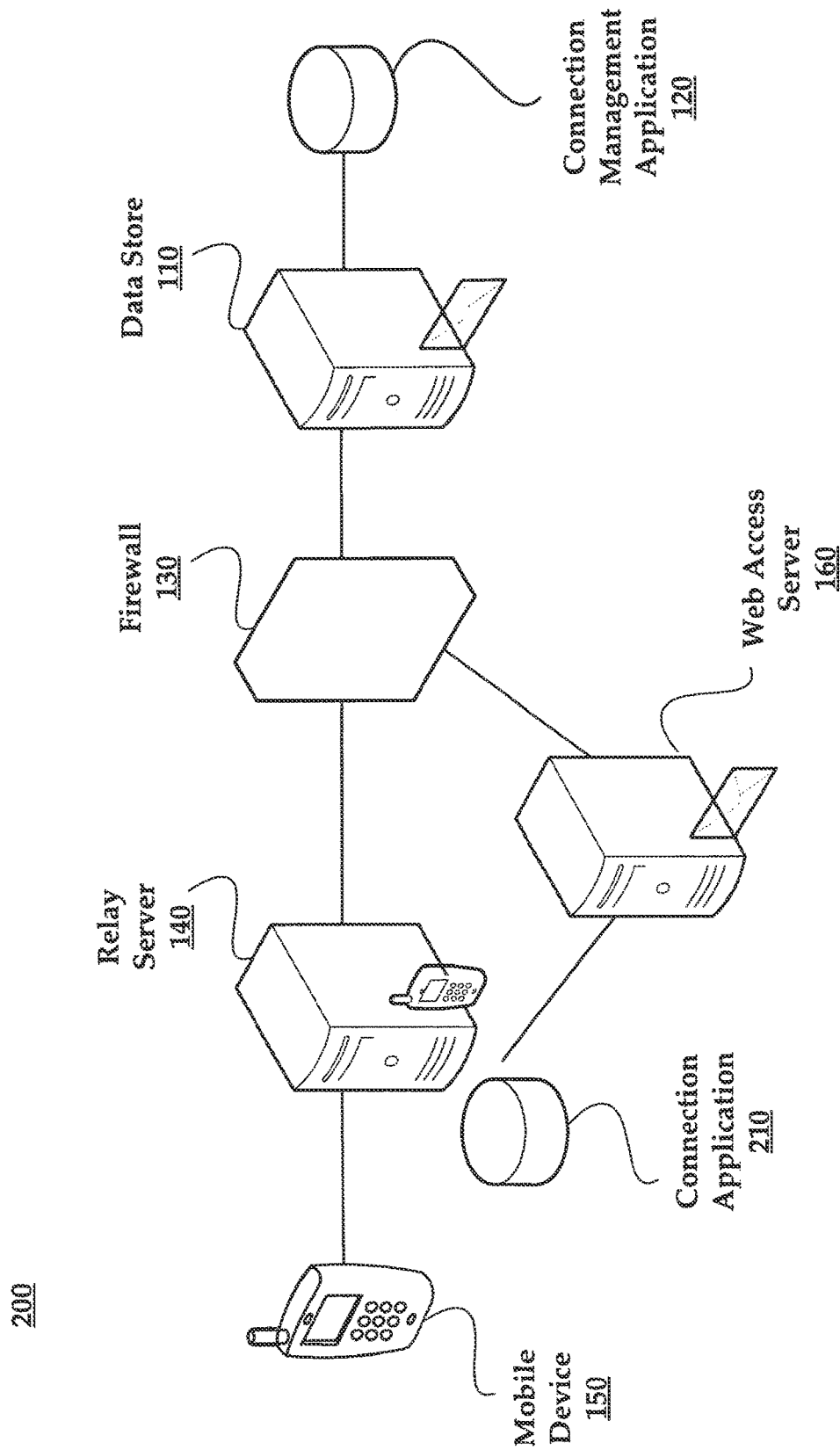
FIG. 2 illustrates network architecture according to an embodiment of the present invention.

FIG. 2 illustrates network architecture 200 according to an embodiment of the present invention. As illustrated in FIG. 2, network 200 includes many of the same elements as network 100 of FIG. 1. Network 200, however, further includes a connection application 210 communicatively coupled to or otherwise hosted by relay server 140 (e.g., stored in memory). Connection application 210 is executable by a processor of relay server 140 to establish a connection between the relay server 140 and web access server 160. The established connection allows for machine-to-machine communication between the relay server 140 and the data store 110 via the web access server 160. As such, relay server 140 and data store 110 may exchange data, including data objects requested by mobile device 150. Data objects are inclusive of e-mail, calendar data, to do lists, and documents attachments such as word processing documents, spreadsheets, presentation slide decks, photos, sound files, and motion picture files. Data objects may reside at or are otherwise accessible by data store 110 (e.g., a Microsoft Exchange Server or file server).

Web access server 160 may reside in a separate location from data store 110; as illustrated in FIG. 2, the web access server 160 is outside of the firewall 130. Web access server 160 may also reside in the same location as data store 110, such as behind the firewall 130. Web access server 160 may also be located in its own protected network to help prevent unwanted intrusion. Regardless of where web access server 160 resides, connection application 210 can establish a connection between the web access server 160 and relay server 140 utilizing credentials of a user at mobile device

150. These credentials may be provided directly through the mobile device 150 or may also be provided via a desktop computer during an initial log-in/setup session with relay server 140. Credentials may also be provisioned by another application such as a provisioning server (not shown).

Figure 3:
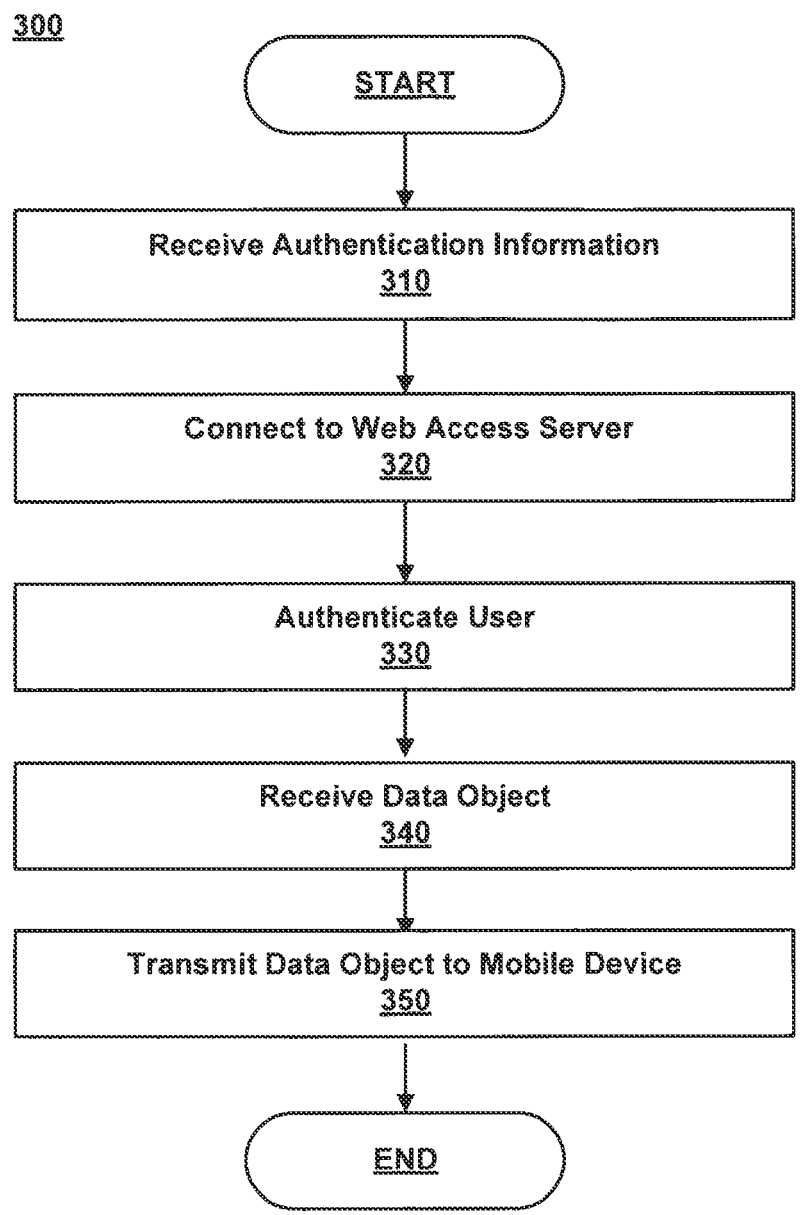
FIG. 3 illustrates a method for web-based access to data objects.

FIG. 3 illustrates a method 300 for web-based access to data objects. The method 300 as illustrated in FIG. 3 includes receiving authentication information from a mobile device 150 or other source of credentials such as a provisioning server, establishing a connection to a web access server 160 associated with the data store 110 hosting a data object, authenticating the user, receiving at the relay server the data object from data store 110, and transmitting the data object to the mobile device 150.

In step 310, authentication information is received. The authentication information may be received from mobile device 150 at relay server 140 or already be stored at relay server 140 if the mobile device 150 has been recognized by the relay server 140. In this latter instance, the authentication information may be retrieved from a database at the relay server 140 in response to some sort of identifying information from the mobile device 150. Credentials may also be providing by another computing device operating in conjunction with relay server 140 such as a provisioning server (not shown). The authentication information (e.g., a user name, password, domain, and/or a token) is associated with accessing data store 110, which stores one or more data objects. A user may enter the authentication information into the mobile device 150, which then sends the information to relay server 140.

In some embodiments, other types of information may also be sent from mobile device 150 to relay server 140. This information may be independent of authentication information (e.g., information not used to authenticate a user). The other information may include profile data or indicate certain types of information to which a user may be allowed access at data store 110. The other information might also include a 'keep alive' ping that prevents the relay server 140 from terminating its connection with the mobile device 150. The other information may likewise include instructions for the relay server 140 to generate a 'keep alive' ping with the web access server 160 in order to prevent termination of that connection as is further described below.

In step 320, a connection to a web access server 160 is established. Specifically, the connection may be established by a connection application 210 communicatively coupled to the relay server 140. Connection application 210 is executable by a processor of relay server 140 to establish a connection between the relay server 140 and the web access server 160 associated with the data store 110 hosting one or more data objects.

In step 330, the user of mobile device 150 is authenticated. The authentication information received by relay server 140 is sent to web access server 160, which authenticates the user based on the provided authentication information. In some embodiments, if the connection between the relay server 140 and the web access server 160 is terminated, the connection may automatically be re-established whereby the authentication information is automatically re-transmitted to the web access server 160 when the connection is re-established.

In step 340, the data object is received by the relay server 140 from the data store 110. Once the user identity is authenticated by web access server 160 in step 330, relay server 140 is allowed to communicate with data store 110. Specifically, relay server 140 is allowed to access a data object hosted at data store 110. The data object may include e-mail, calendar data, contact data, and other data objects as previously described. Once the relay server 140 receives the data object, the relay server 140 can send the data object to the mobile device 150 in step 350. In some embodiments, the relay server 140 may receive the data object from the data store 110 via the web access server 160.

The connection between the relay server 140 and the web access server 160 may be terminated for various reasons. For example, the connection may time out after a predetermined period of time or based on inactivity. Disconnects may also occurs as a result of equipment or network failures. In some embodiments, the connection may be automatically re-established by connection application 210. Where the connection cannot be re-established immediately, the connection application 210 may periodically poll the web access server 160 to determine whether the connection can be re-established and seek to re-establish the connection when results of polling indicate such a possibility.

Further embodiments may allow a user to register to receive notifications when data store 110 or a data object in data store 110 is updated. These notifications may come from the data store 110 or the web access server 160. A notification may include the actual updated data object. In response to the notification, relay server 140 may determine the status update and provide the update to mobile device 150 or query as to whether the mobile device 150 (or more specifically the user of the mobile device 150) wishes to receive the same.

The terms "computer-readable storage medium" and "computer-readable storage media" as used herein refer to a medium or media that participates in providing instructions to a CPU for execution. Such media can take many forms including, but not limited to, non-volatile and volatile media. Non-volatile media include, for example, optical or magnetic disks, such as a fixed disk. Volatile media include dynamic memory, such as system RAM. Common forms of computer-readable storage media include, for example, a floppy disk, a flexible disk, a hard disk, magnetic tape, any other magnetic medium, a CD-ROM disk, digital video disk (DVD), any other optical medium, punch cards, paper tape, any other physical medium with patterns of marks or holes, a RAM, a PROM, an EPROM, a FLASHEPROM, any other memory chip or cartridge.

Transmission media may include coaxial cables, copper wire and fiber optics and various computer bus. Transmission media can also take the form of acoustic or light waves such as those generated during radio frequency (RF) and infrared (IR) data communications. Carrier wave or other media for transmission of information may be used.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

While the present invention has been described in connection with a series of preferred embodiment, these descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art.

I claim:

1. A relay server for providing a mobile device web-based access to a data object via a web access server, the relay server comprising:
 a memory configured to host a connection application;
 a processor configured to execute the connection application to:
  receive, from a source of credentials, authentication information;
  establish a connection to the web access server associated with a data store hosting a data object;
  authenticate a user based on the authentication information;
  receive the data object from the data store;
  transmit the data object to the mobile device associated with the user;
  detect that the connection between the relay server and the web access server is terminated; and
   in response to detecting that the connection is terminated, automatically re-establish the connection including automatically re-transmitting the authentication information to the web access server when the connection is re-established.

2. The relay server of claim 1, wherein the source of credentials includes the mobile device.

3. The relay server of claim 1, wherein the source of credentials includes a provisioning server.

4. The relay server of claim 1, wherein the source of credentials includes a database located at the relay server.

5. The relay server of claim 1, wherein the authentication information includes one of a user name, password, domain, and a token.

6. The relay server of claim 1, wherein the authentication information is associated with accessing the data store.

7. The relay server of claim 1, wherein the data object includes one of: e-mail, calendar data, contact data, to do list, documents attachment, word processing document, spreadsheet, presentation slide deck, photo, sound file, and motion picture file.

8. The relay server of claim 1, wherein the processor is further configured to execute the connection application to receive a registration request from the user to receive a notification when the data store or the data object in the data store are updated.

9. The relay server of claim 8, wherein the processor is further configured to execute the connection application to receive the notification from one of the data store or the web access server.

10. The relay server of claim 9, wherein the notification includes the actual updated data object.

11. The relay server of claim 9, wherein the processor is further configured to execute the connection application to, in response to receiving the notification, determine a status update and providing the status update to the mobile device.

12. A method of providing a mobile device web-based access to a data object via a web access server, the method comprising:
 at a relay server:
  receiving, from a source of credentials, authentication information;
  establishing a connection to the web access server associated with a data store hosting a data object;
  authenticating a user based on the authentication information;
  receiving the data object from the data store;
  transmitting the data object to a mobile device associated with the user;
  detecting that the connection between the relay server and the web access server is terminated; and
   in response to detecting that the connection is terminated, automatically re-establishing the connection including automatically re-transmitting the authentication information to the web access server when the connection is re-established.

13. The method of claim 12, wherein the source of credentials includes the mobile device.

14. The method of claim 12, wherein the source of credentials includes a provisioning server.

15. The method of claim 12, wherein the authentication information includes one of a user name, password, domain, and a token.

16. The method of claim 12, wherein the data object includes one of: e-mail, calendar data, contact data, to do list, documents attachment, word processing document, spreadsheet, presentation slide deck, photo, sound file, and motion picture file.

17. The method of claim 12, further comprising receiving a registration request from the user to receive a notification when the data store or the data object in the data store are updated.

18. The method of claim 17, further comprising receiving the notification from one of the data store or the web access server.

19. The method of claim 18, wherein the notification includes the actual updated data object.

20. The method of claim 18, further comprising, in response to receiving the notification, determining a status update and providing the status update to the mobile device.

* * * * *